Dec. 7, 1954  W. V. SPURLIN  2,696,292
SPIRAL CONVEYER FEEDER BOWL
Filed March 19, 1951  3 Sheets-Sheet 1

INVENTOR.
William V. Spurlin
BY
William D. Carothers
His Attorney.

Dec. 7, 1954 W. V. SPURLIN 2,696,292
SPIRAL CONVEYER FEEDER BOWL
Filed March 19, 1951 3 Sheets-Sheet 2

INVENTOR.
William V. Spurlin
BY
His Attorney.

INVENTOR.
William V. Spurlin
His Attorney.

United States Patent Office 2,696,292
Patented Dec. 7, 1954

2,696,292
SPIRAL CONVEYER FEEDER BOWL

William V. Spurlin, Indiana, Pa., assignor to Syntron Company, Homer City, Pa., a corporation of Delaware Application March 19, 1951, Serial No. 216,364

6 Claims. (Cl. 198—220)

This invention relates generally to feeder bowls and more particularly to a feeder bowl having a spiral conveying surface which has no obstruction thereabove and provides a spiral conveying path permitting uninhibited movement of articles therealong.

The principal object of this invention is to provide a spiral conveyor feeder bowl which is provided with a conveyor track that extends from the bottom of the bowl upwardly, extending farther from the center of the bowl as it progresses upwardly in a true spiral path on the inner surface of the wall to the top thereof for the purpose of providing an unobstructed and uninhibited movement of articles along the spiral conveyor track. Frequently conveyor paths, particularly those in a bowl wherein the articles move in an annular path that is substantially helical, the underside of the same path or another path in the bowl may be too close and thus permit the articles to jam or otherwise lodge between the conveyor flights. In the structure comprising this invention the floor of the conveyor path is open upwardly and the wall does not overhang the floor so that there is no possible chance for obstruction whatsoever. Thus any articles being conveyed therealong will not be stopped or become jammed for any reason due to the construction of the spiral conveyor floor.

Another object of this invention is the provision of a cast bowl, the unitary structure of which provides a spiral conveyor path. This cast bowl may be made of suitable material such as aluminum, which will not vibrate within itself and will provide an ideal structure for a conveyor surface.

Another object of this invention is the provision of a fabricated spiral conveyor feeder bowl wherein the spiral conveyor path is produced by a continuous floor that starts from the bottom of the bowl and is secured to the side of the bowl in its annular helical path to the top of the bowl, the floor becoming narrower as it progresses to the top of the bowl. This floor is initially enclosed by a spiral upstanding strip, forming a side wall which rests on the bottom of the bowl and starts up the conveyor floor. As the floor decreases in width the wall approaches the wall of the bowl resulting in a conveyor floor that is a true spiral of uniform width continuing to the top of the bowl.

Other objects and advantages appear hereinafter in the following description and claims.

The accompanying drawings show, for the purpose of exemplification without limiting the invention or claims thereto, certain practical embodiments of the invention wherein:

Figure 1:
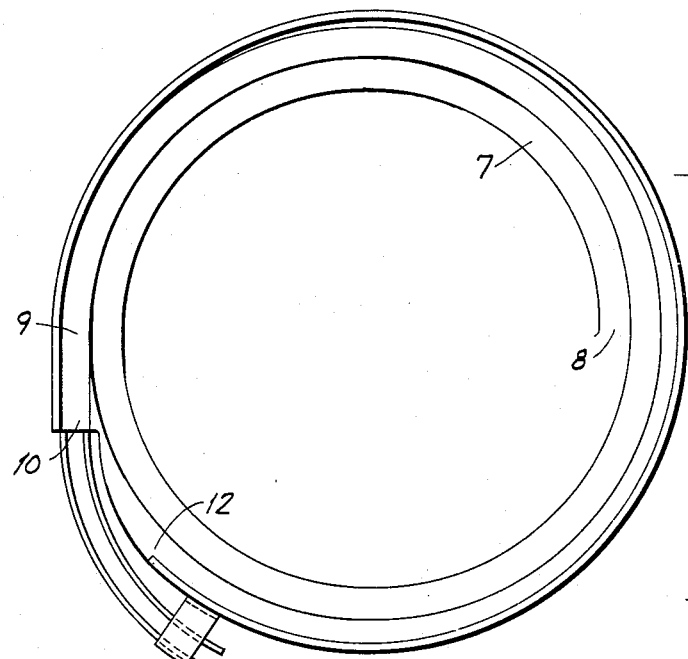
Fig. 1 is a top plan view of a cast spiral conveyor feeder bowl comprising this invention.
Figure 2:
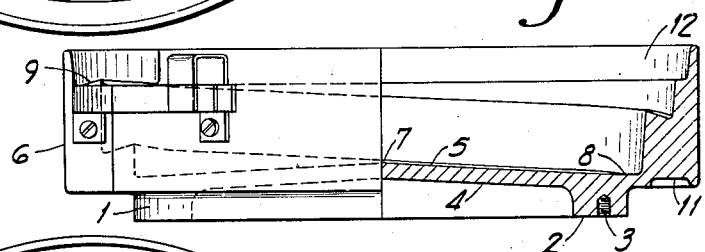
Fig. 2 is a partial sectional view of the structure shown in Fig. 1.
Figure 3:
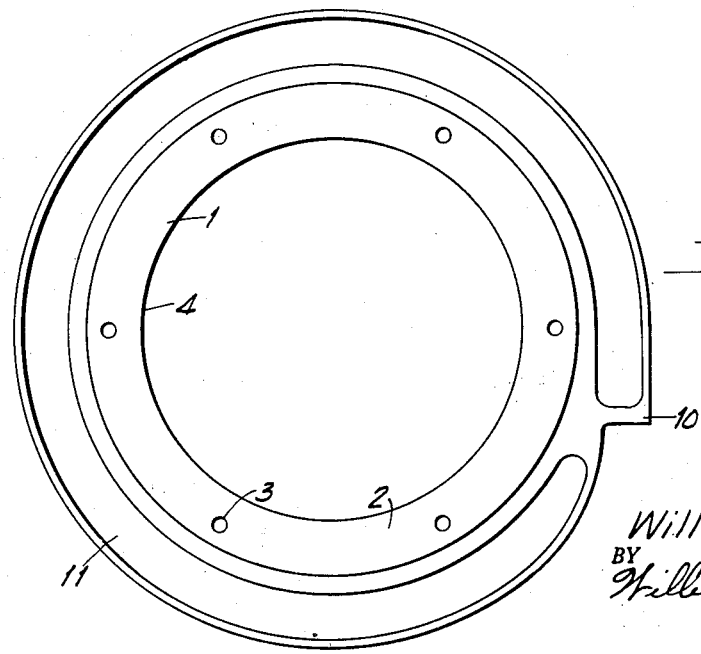
Fig. 3 is a bottom plan view of the structure shown in Fig. 1.

The spiral conveyor feeder bowl as shown in Figs. 1, 2 and 3 is a casting and is provided with the annular base member 1 which has a flat surface 2 in which are threaded openings 3 for receiving the mounting bolts to support the bowl on a feeder motor which is preferably an electromagnetic motor that has an armature mounted on the underside of a bowl and supported by flexible elements which together constitute a mechanical vibrating system that has a natural period of vibration, having a frequency that is preferably tuned to within a few cycles of the operating current impulses of the electromagnet.

The annular member 2 is hollowed out as indicated at 4 and forms the under surface of the bottom 5 of the bowl. The upper surface of the bottom 5 is preferably conical in shape as illustrated for the purpose of causing the articles to flow to the perimeter at a greater speed while being conveyed in a circular path.

The wall 6 of the bowl is thick at the bottom owing to the construction of the spiral conveyor track or floor 7 which starts at 8 and extends in a true spiral path up the side of the bowl wall with each revolution being greater in diameter than the previous revolution. The upward slope of the spiral conveyor floor 7 is substantially uniform from the starting point 8 up until the uppermost point of 9, from whence the conveyor floor extends in a straight line for a short section as indicated at 10. The purpose of the square corner at 10 is to provide a flat surface for mounting a short selector trough as shown in Figs. 1 and 2 of the drawing and which consists of two parallel rails sloping downwardly from 10.

The underside of the bowl may be hollowed out as shown at 11 in Figs. 2 and 3. By properly hollowing out the cast bowl one can substantially balance the bowl relative to its central vertical axis so that the bowl itself will not provide any eccentric action when impelled in an arcuate path with a predetermined slope. The additional shelf 12 adjacent the upper rim of the bowl also aids in balancing the bowl relative to its own axis.

Figure 4:
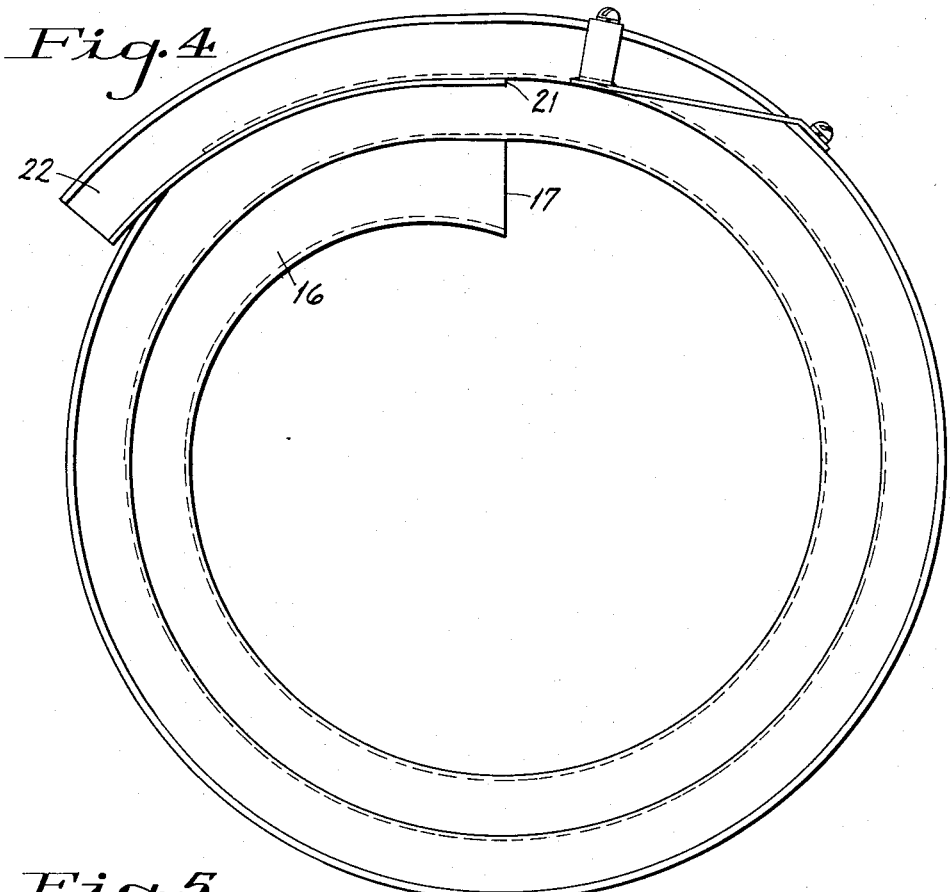
Fig. 4 is a top plan view of a fabricated spiral conveyor feeder bowl.
Figure 5:
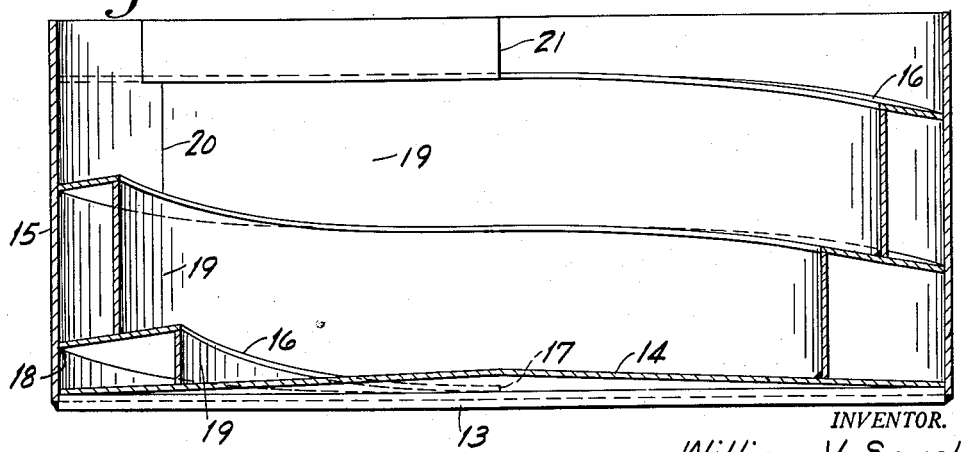
Fig. 5 is a sectional view of the feeder bowl shown in Fig. 4.

The structure as shown in Figs. 4 and 5 is fabricated from sheet metal but represents a bowl which has similar characteristics to that of the casting. This bowl, as illustrated, has the base member 13 which has welded thereto the bottom 14 and the side 15 which is in the form of an annular cylindrical upstanding wall. The spiral conveyor floor 16 starts at 17 as illustrated in Figs. 4 and 5. The floor part or track extends clear to the wall at 18 and is secured thereto. The inner edge of the floor 16 is supported by the upwardly extending strip 19, the upper edge of which is inclined at the same degree of slope desired for the spiral conveying floor. The upstanding strip 19 thus increases in height until it attains the actual pitch between the adjacent levels of the conveyor floor 16 at which time the strip 19 becomes uniform in height. At this point the strip starts to overlap itself as indicated. It will be noted that the conveyor floor 16 is wide adjacent the bottom 14 of the bowl and as the upstanding strip comes around and passes the point 17, it starts up the inclined floor 16 thereby boxing off a certain portion of the floor but leaving the conveyor surface and, thus, continues in this manner until it reaches the upper part of the bowl wherein the upstanding portion 19 merges into the cylindrical wall 15, as illustrated at 20, and the floor surface 16 passes outwardly through the wall, as indicated at 21, and terminates in an upwardly open spiral trough or chute member 22 as shown in Fig. 4.

In each instance as shown it is preferable to have a conical shape bottom for the bowl and the slope of the cone forming the bottom of the bowl is carried over into the slope of the conveyor floor 7 as shown in Fig. 2 and as shown at 16 in Fig. 5. This slope is maintained until the spiral conveyor floor surface attains the top of the bowl and is directed into the chute. The principal reason for providing a slight slope, which is dished toward the annular wall of the bowl, is to insure that the articles will remain on the conveying surface during their flight from the bottom of the bowl to the top of the bowl and out the discharge.

Figure 6:
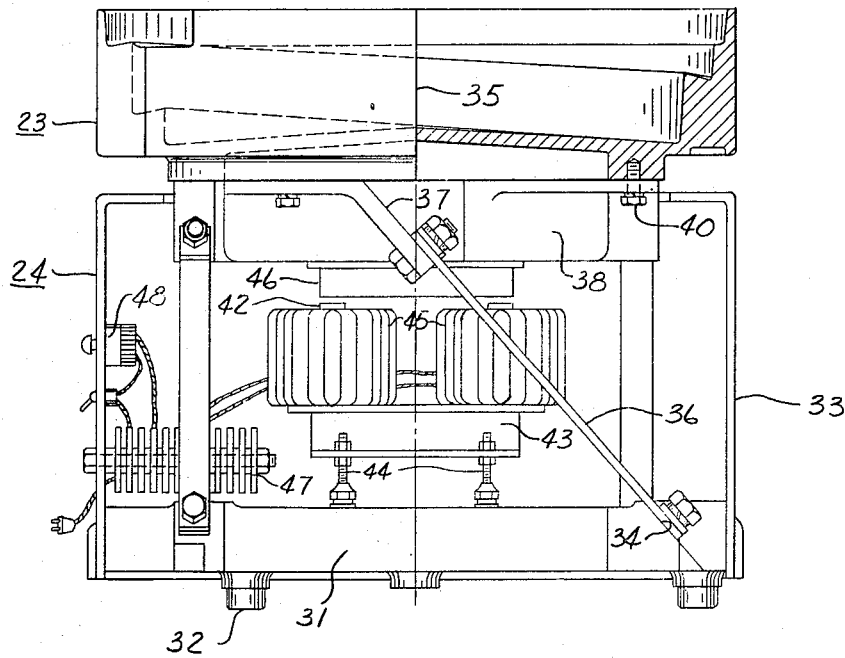
Fig. 6 is a view in section of a feeder bowl mounted on an electromagnetic motor.

Referring to Fig. 6 the feeder bowl 23 is mounted on an electromagnetic motor 24 which comprises the massive base 31 supported on the resilient feet 32 that carry the outer casing 33 that encloses the motor and control parts.

The base 31 has the sloping seats 34 disposed symmetrically about the vertical central axis 35. The seats 34 support the springs 36 the upper ends of which are clamped to corresponding spring seats 37 on the frame 38. The bowl 23 is bolted to the frame by the bolts 40.

The motor illustrated is of the electromagnetic type and has the core 42 mounted on the brackets 43 adjustably supported by the bolts 44 on the base 31. This core 42 is C-shaped and has its coil or field windings 45 on the legs thereof. The armature 46 is secured to the under side of the frame 38. The core member is then adjusted to provide the proper air gap between its poles and the armature. Each energy impulse of the field pulls on the armature which causes the springs 36 to flex in an inclined arcuate path of movement downwardly. When the energy impulse passes the springs return the bowl to its normal position. The momentum of the bowl and frame travels somewhat beyond the normal or static position but the springs are tuned to have a natural period of vibration a few cycles off the frequency of the current impulses supplied to the field coil. Thus the bowl reciprocating in its inclined arcuate movement keeps in synchronism with the energy impulses. To decrease the period, the current impulses of an alternating current source are cut in half by employing a half wave rectifier such as shown at 47. This rectifier and the rheostat 48 are placed in series with the motor field coil and the source of alternating current supply to control the magnitude of the reciprocation. A permanent magnet may be employed as the armature in place of the rectifier.

While, for clarity of explanation, certain embodiments of this invention have been shown and described, it is to be understood that this invention is capable of many modifications and changes in its construction and arrangement, and some parts may be employed with the conjoint use of other parts and without departing from the spirit and scope of this invention.

I claim:

1. An article handling feeder bowl for delivering a series of articles in turn which comprises a feeder bowl having a bottom with an upstanding annular wall, motor means to support and effect a vibratory reciprocation of said bowl in an inclined arcuate path of movement, an inclined conveyor track extending from the bottom of said bowl upwardly around said annular wall for feeding articles from the bowl when the motor means is energized, said track being flat and sloping downwardly toward said wall, the articles engaging the track and the wall to guide the same as the vibratory motion feeds them along the track.

2. The structure of claim 1 characterized in that said conveyor track is a spiral inclined track extending from the bottom of the bowl upwardly around said annular wall for feeding articles from the bowl when the motor is energized, the track progressively receding from the center of the bowl as the spiral conveyor track approaches the rim of the wall to provide uninhibited movement of the articles along the spiral conveyor track.

3. The structure of claim 1 characterized in that said spiral conveyor track is secured to the annular wall and becomes progressively narrower as it approaches the top of the bowl, and an upstanding wall strip starting on the bottom of the feeder bowl under the track and passing around said bowl on said track to form the guide wall of the track.

4. An article handling feeder bowl for delivering a series of articles in turn which comprises a feeder bowl having a bottom with an upstanding annular wall, motor means to support and effect a vibratory reciprocation of said bowl in an inclined arcuate path of movement, an inclined conveyor track extending from the bottom of said bowl upwardly around said annular wall for feeding articles from the bowl when the motor means is energized, and a discharge conveyor section having spaced parallel rails mounted on said bowl and forming an extension of the conveyor track to feed the articles from the bowl.

5. An article handling feeder bowl for delivering a series of articles in turn which comprises a feeder bowl having a bottom with an upstanding annular wall, motor means to support and effect a vibratory reciprocation of said bowl in an inclined conveyor track extending from the bottom of said bowl upwardly around said annular wall for feeding articles from the bowl when the motor means is energized, and ejector abutment means comprising a vertically disposed strip having one end fastened to the bowl and extending out over the width of the track but spaced from the conveyor surface thereof.

6. An article handling feeder bowl comprising a feeder bowl having a bottom with an upstanding annular wall, motor means to support and effect a vibratory reciprocation of said bowl in an inclined arcuate path of movement, an inclined conveyor track extending from the bottom of said bowl upwardly around said annular wall for feeding articles from the bowl when the motor means is energized, and means defining an offset in said wall at right angles to said track and terminating the same to provide a support for extraneous track section to carry the articles from the bowl.

References Cited in the file of this patent

UNITED STATES PATENTS

| Number | Name | Date |
| --- | --- | --- |
| 2,609,914 | Balsiger et al. | Sept. 9, 1952 |

FOREIGN PATENTS

| Number | Country | Date |
| --- | --- | --- |
| 279,119 | Great Britain | Oct. 15, 1927 |